United States Patent [19]
Guzovskiy et al.

[11] Patent Number: 5,752,258
[45] Date of Patent: May 12, 1998

[54] ENCODING METHOD FOR DIRECTORY STATE IN CACHE COHERENT DISTRIBUTED SHARED MEMORY SYSTEM

[75] Inventors: Aleksandr Guzovskiy, Lowell; Robert C. Zak, Jr., Lexington; Mark Bromley, Andover, all of Mass.

[73] Assignee: Sun Microsystems, Inc., Mountain View, Calif.

[21] Appl. No.: 672,946

[22] Filed: Jul. 1, 1996

[51] Int. Cl.⁶ .................................................. G06F 12/08
[52] U.S. Cl. ............................ 711/120; 711/124; 711/145
[58] Field of Search ................................... 711/145, 124, 711/120

[56] References Cited

U.S. PATENT DOCUMENTS 5,230,070  7/1993  Liu ............................................. 711/145
5,265,232  11/1993  Gannon et al. ............................ 711/124
5,426,754  6/1995  Grice et al. ............................... 711/124

*Primary Examiner*—Eddie P. Chan
*Assistant Examiner*—Reginald G. Bragdon
*Attorney, Agent, or Firm*—Homer L. Knearl; William J. Kubida; Holland & Hart LLP

[57] ABSTRACT

A directory system directs cache line access requests from processors in a multi-processor system with a shared memory system through a cache line states directory. The cache line states directory stores a state value that identifies a cache line shared states word. The cache line shared states word identifies the processor that owns the cache line and the state of access of each processor that shares access to the cache line. A state value encoder encodes a cache line shared state word into a state value and loads the state value into the cache line states directory. A state value decoder decodes the state value into a cache line shared state word for use by the cache line directory system in retrieving the cache line. A plurality of cache line tables are used with each cache line assigned to one of the tables. The cache line table stores a state value for each cache line shared states word stored in the table. The encoder and decoder perform a table look-up to convert between a cache line shared state word and a state value. Each of said cache line tables stores an ordered list of cache line shared state words and their corresponding state values. The ordered list is a list of cache line shared state words that have the most significance to the multi-processor system.

10 Claims, 3 Drawing Sheets

| CACHE LINE TABLE ||||| 
|---|---|---|---|---|
| SV | CLSS |||| 
| 0 | OWNER 1 | $S_2$ | $S_3$ | $S_6$ | $S_8$ |
| 1 | OWNER 1 | $S_2$ | $S_4$ | $S_6$ | $S_8$ |
| 2 | OWNER 1 | $S_3$ | $S_5$ | $S_7$ | |
| 3 | OWNER 2 | $S_3$ | $S_5$ | $S_7$ | |
| 4 | OWNER 2 | $S_1$ | $S_4$ | $S_8$ | |
| 5 | OWNER 2 | $S_1$ | $S_3$ | $S_4$ | |
| ... | ---------- |||| 
| 30 | OWNER 8 | $S_1$ | | |
| 31 | ESCAPE ||||

FIG.5

ENCODING METHOD FOR DIRECTORY STATE IN CACHE COHERENT DISTRIBUTED SHARED MEMORY SYSTEM

BACKGROUND OF INVENTION

1. Field of the Invention

This invention relates to a method and apparatus for using entries in a partial mapped directory where the directory entries preserve cache coherency in a memory system shared by multiple processors. More particularly the invention relates to encoding the directory entries so as to use the directory more effectively.

2. Description of Related Art

A memory sharing system for controlling the sharing of memory by multiple processors has been used for many years to increase efficient use of memory. The speed of processing of each of the processors is much higher than the storage processing speed of the memory system. Thus, over the years various techniques have been devised to better match data processing speed in the processor with data access speed to data stored in a memory system.

One technique for better matching the data processing speed of the processor to data access speed in the storage system is to add cache storage systems at the processor. The data access speed of the cache system is much higher than the data access speed of the memory shared by all processors. Each processor has its own cache separate from the shared memory. Accordingly, data currently being worked on by a processor will be stored in its cache. This creates a cache coherency problem.

The shared memory programming model, which serves as the basis for most multi-processor operating systems (UNIX, WindowsNT, etc.) and applications, requires that each of the processors accessing the system must see the same data in memory. Another cardinal rule is that as data is posted in the shared memory the act of posting must be visible to all processors sharing the memory.

In a cache system if first processor is working on a block of data, hereinafter referred to as a cache line, and a second processor wishes to access the same data or data in the same cache line, then the second processor must be made aware of the fact that the current data it is seeking is in the first processor's cache. Thus, the memory system managing the shared memory for all of the processors must maintain the coherency of cache lines between the multiple processors.

A technique for doing this is to identify cache line processor states for each cache line in use in the multiple processor system. Exemplary, cache line states are M,O,S,I and E. State M means the cache line has been modified by the processor associated with the state. State C means the cache line is owned by the processor, and state S means the cache line is shared by the processor. State I means the cache line is invalid for the processor, and E means the cache line is exclusive for the processor.

In a bus-based symmetric multi-processor (SMP) system, to communicate this state information for a cache line, a protocol known as the "Snoopy Bus Protocol" provides that these various cache line processor states be communicated along the system bus between the multiple processors. Each time there is a change of state of a cache line at one of the processor caches, that change of state is broadcast on the system bus to all other processors. The problem with this approach is that if the number of multiple processors and cache systems becomes high then the system bus is soon filled with nothing but change of state cache information, or snoop traffic. The scalability of the SMP system in processors is thus limited by the amount of snoop traffic supported by the system bus before it saturates.

To alleviate this problem, a directory of cache line entries was developed. The directory entry identifies the owner of the cache line and the state of that cache line relative to each and every other processor in the multi-processor system sharing the common memory. As the number of processors in the multi-processor system approaches a large number, for example 100 processors, these cache line entries become quite large and the number of cache lines becomes quite large. As a result, this directory approach consumes a great deal of memory just storing the directory.

To reduce the amount of memory consumed by the directory, the most recent design uses partially mapped directories. Each cache line in the various caches of the multiple processors has an entry in the directory, however, each directory entry is much smaller. In a partially mapped directory the entry identifies the owner of the cache line and the first "m" number of sharers (processors sharing information in the cache line). Typically, "m" is 2, 3 or 4.

Limiting the number of sharers referenced in the directory entry greatly reduces the size of the directory but raises another problem. If there are more than 4 processors sharing the cache line, the shared memory system must take action to accommodate the additional identification of processors sharing the cache line. This has been done by allocating more space to the directory, by creating a supplemental directory or by issuing a broadcast operation in the case of incomplete directory information. The first two options require additional memory space for the directory. The third option requires more system bandwidth and thus takes more time.

SUMMARY OF THE INVENTION

A directory system directing cache line access requests from processors in a multi-processor system with a shared memory system through a cache line states directory. The cache line states directory stores a state value that identifies a cache line shared states word. The cache line shared states word identifies the processor that owns the cache line and the state of access of each processor that shares access to the cache line.

A state value encoder encodes a cache line shared state word into a state value and loads the state value into the cache line states directory. A state value decoder decodes the state value into a cache line shared state word for use by the cache line directory system in retrieving the cache line.

A plurality of cache line tables are used with each cache line assigned to one of the tables. Each of the cache line tables stores a plurality of cache line shared state words for the cache line assigned to the table. The cache line table also stores a state value for each cache line shared state word stored in the table. The encoder performs a table look-up based on the cache line shared state word in the assigned cache line table to encode the cache line shared state word into a state value. The decoder performs a table look-up based on the state value in the assigned cache line table to decode the state value into a cache line shared state word.

As another feature of the invention, the state value is an n-bit word and each of the cache line tables has an entry capacity $2^n$ entries of cache line shared state words with their corresponding state value. Each of said cache line tables stores an ordered list of $2^n-1$ cache line shared state words and their corresponding state values. One entry contains a state value to identify an escape process or supplemental directory for cache line shared state words not included in the ordered list.

In another feature of the invention the ordered list is a list of cache line shared state words that have the most significance to the multi-processor system. Accordingly, when the multi-processor system is designed, the pattern of sharing of cache lines may be defined. Based on this pattern, certain cache line shared state words will be more significant, i.e. more likely to occur, more useful to certain processors, more critical to processes performed by the multi-processor system. For whatever reason, the list of cache line shared state words may be arranged or ordered in a preferred sequence in the cache line table. The ordered list is terminated after $2^n-1$ entries. One entry remains as an escape in the situation where the cache line shared state word of interest did not make the ordered list.

The great advantage and utility of the present invention is it allows maximally efficient use of memory serving as a fully mapped or partially mapped directory.

The foregoing and other features, utilities and advantages of the invention will be apparent from the following more particular description of a preferred embodiment of the invention as illustrated in the accompany drawings.

BRIEF DESCRIPTION OF DRAWINGS

FIG. 5 is an example of the contents of a cache line table.

DETAILED DESCRIPTION OF PREFERRED EMBODIMENTS

Figure 1:
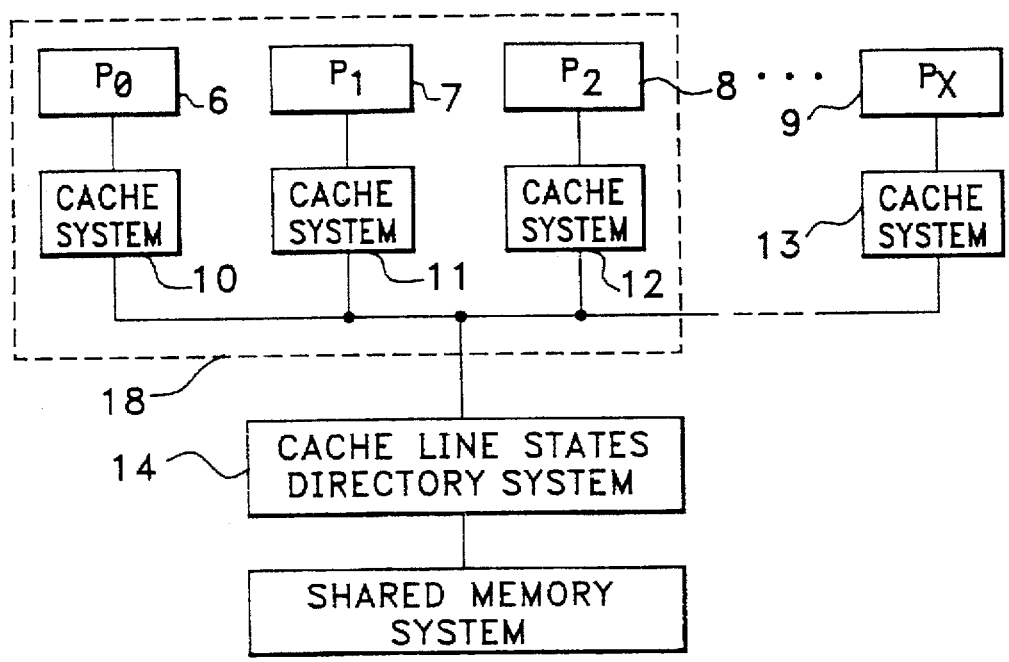
FIG. 1 shows a shared memory system in a preferred embodiment of the invention where there is a cache line states directory system.

In the preferred embodiment of the invention illustrated in FIG. 1, a multiple processor shared memory system utilizes a cache line states directory system 14 to provide cache line shared state information to the multiple processors, 6, 7, 8 and 9. Each of the processors P0 through Pm have their own cache system 10, 11, 12 and 13, respectively. During a read or write operation each of the processors accesses the cache line states directory system to either ascertain the status of the cache line or to update the status of the cache line. In general both read and write operations may require a read and write of the directory entry. A read operation necessitates only obtaining the information from a cache line directory entry, i.e. the ownership-and shared states of the cache line. In a write operation the cache line shared states may be updated, and thus the cache line directory entry may be updated.

Retrieving information from the cache line directory or updating the cache line directory are operations performed by the cache line states directory system 14. In the cache lines states directory system 14, the directory contains a state value for the cache line shared state information rather than the actual cache line shared state information. This state value is an encoded n-bit word identifying a state that corresponds to a unique cache line shared state word. For example, a cache line shared state word might identify processor P1 as the owner of the cache line and indicate the shared state for that cache line with processor P2 and P9.

Figure 2:
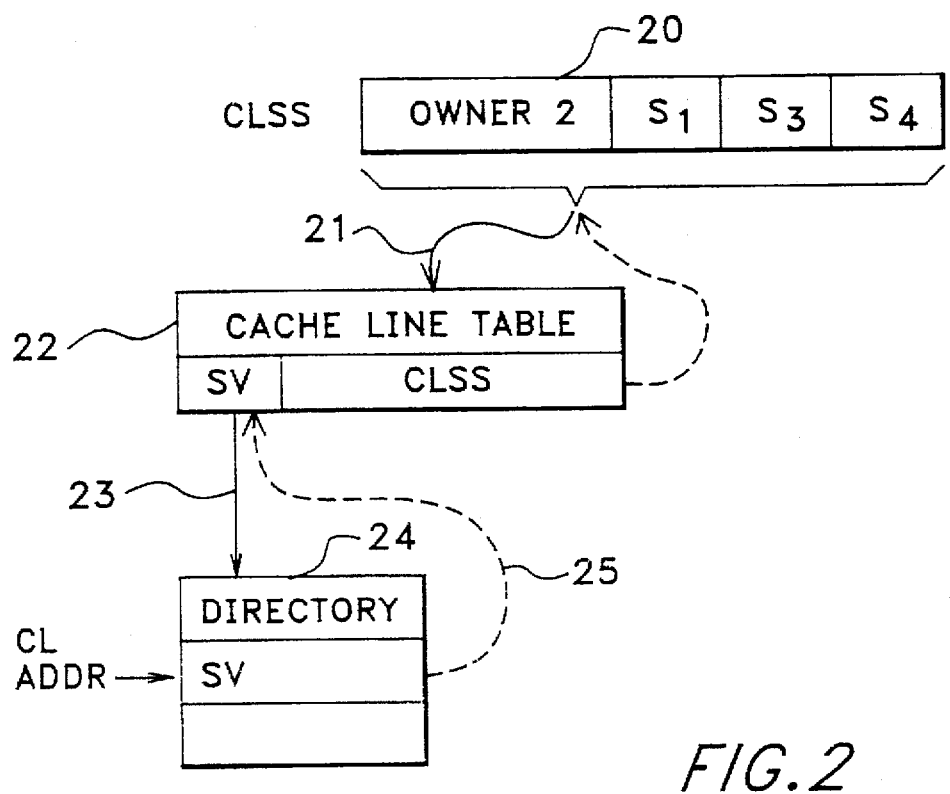
FIG. 2 is a data flow diagram indicating the flow of information in the directory system of FIG. 1.

In FIG. 2, the flow of shared state information for a cache line is illustrated. A cache line shared state word 20 identifies the processor that owns the cache line and the shared states for processors also sharing the cache line. In the example of FIG. 2, the owner of the cache line is processor P2 and processors P1, P3 and P4 share the cache line. The shared states are, for example, MODIFIED, SHARED or INVALID.

Directory system 14 (FIG. 1) contains a cache line table 22 for each cache line and a directory 24 of cache line state values. The cache line table is used to convert the cache line shared state word (CLSS) into a state value (SV) for the cache line shared state word. Effectively the state value identifies the cache line shared state word for the cache line. The state values for the cache line are then stored in directory 24 and may be accessed by a cache line address from a processor P1 - PX to the directory 24.

A processor requesting access to the cache line to obtain the cache line shared state information would send a cache line address to the directory 24. If the access is for a cache line read, then the state value at the cache line address in directory 24 is read. This state value points to the state value in the cache line table 22 as indicated by the dash line arrow 25. From table 22 the state value is converted or decoded into the cache line shared state entry and that entry is provided back to the processor as word 20 in FIG. 2. If the processor then wishes to write or modify the cache line, the states of the cache line shared state word are updated by the processor. The processor passes back the updated cache line shared state word to the cache line table as indicated by the solid arrow 21. The cache line shared state entry in table 22 is encoded to a state value by the cache line table 22. Once the state value encoding is complete the state value as indicated by the solid arrow 23 is loaded into directory 24 at the cache line address for that cache line in the directory.

Figure 3:
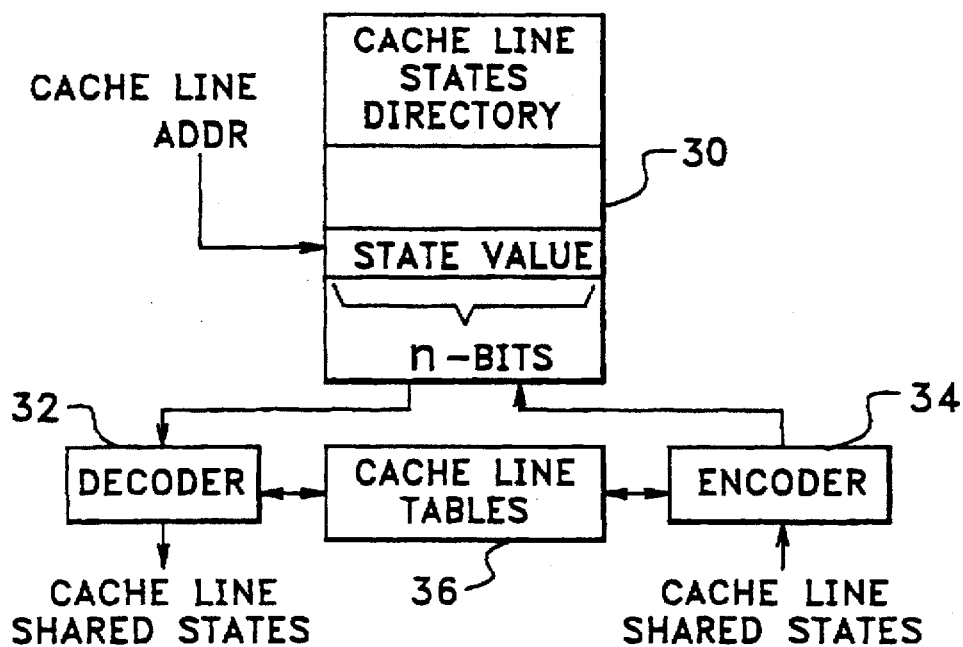
FIG. 3 shows a preferred embodiment of the cache line states directory system of FIG. 1.

The implementation of the cache line states directory system 14 in FIG. 1 is shown in FIG. 3. In FIG. 3 the directory system is implemented by directory 30 storing the state values for the cache line shared state entries. These state values are decoded by decoder 32 into cache line shared state words. When storing state values in directory 30, the cache line shared state word is encoded by encoder 34 and stored in directory 30. In the preferred embodiment, decoder 32 and encoder 34 use a cache line table for each cache line to perform the decoding and encoding operation as a table look up operation.

Accordingly, when a processor in the multi-processor system provides a cache line directory address to directory 30, a state value may be written into the directory at that address or read out of the directory at that address depending upon whether a cache line shared state word is to be decoded or encoded into a state value. Not all cache line shared state words are encoded into a state value. The cache line tables 36 are limited in size and only the most significant cache line shared state words for the multi-processor system design are provided with state values in the cache line table.

In the preferred embodiment of the present invention, the partially mapped directory 30 contains n-bit words which are state values or pointers to an actual cache line shared state word. The actual cache line shared state words are stored as entries in cache line tables 36 such as table 22 in FIG. 2.

Figure 4:
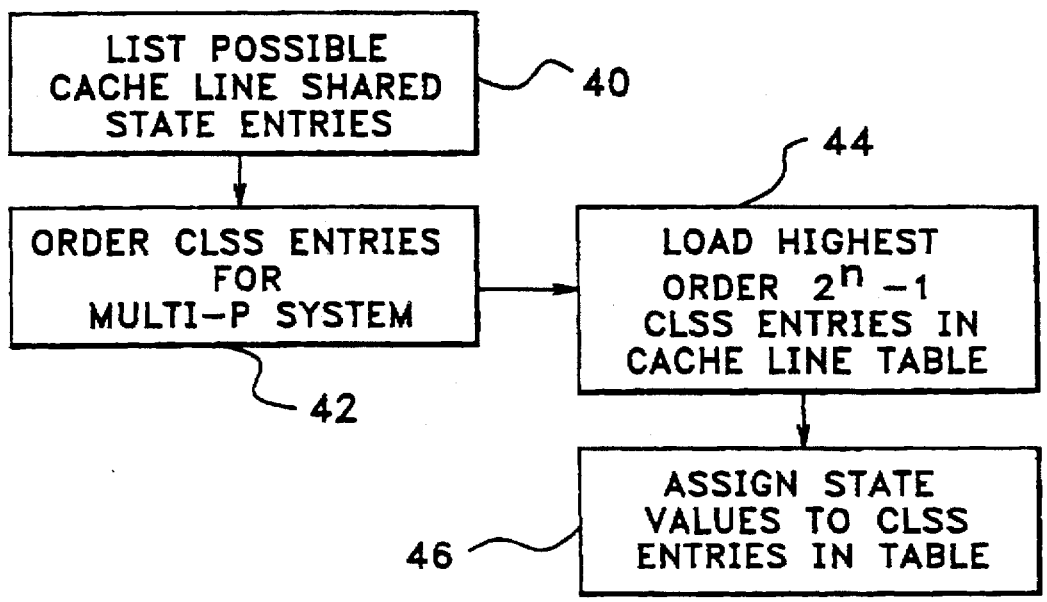
FIG. 4 shows the process for building the entries in a cache line table.

The process for building each cache line table is illustrated in FIG. 4. For a given cache line the process begins at operation 40 by listing all possible cache line shared state entries or words for the cache line. After these cache line shared state words have been enumerated, they are then arranged or ordered in significance according to the multi-processor system design. The criteria for creating this ordered list will be described shortly hereinafter.

After operation 42 orders the CLSS entries, operation 44 loads the highest order 2n−1 number of CLSS entries into the cache line table. The variable n corresponds to the number of bits in the state value word stored in directory 30 (FIG. 3). In other words, the cache line state value word has n-bits.

After operation 44 loads the highest order $2^n-1$ entries in the cache line table, operation 46 assigns state values to each CLSS entry in the table. Since there are $2^n-1$ entries and n bits, there will be one state value unused. This state value is assigned to the condition where the cache line shared state word does not match any cache line shared state entry in the cache line table. In other words, this state value would indicate the need for "escape" to an additional process or to a supplemental directory for the cache line shared state word.

An example of a cache line table is shown in FIG. 5. The cache line table includes a column for state values and a column for cache line shared state entries. As discussed earlier for FIG. 2, the cache line shared state words generally identify an owner followed by a shared state indicator identifying each of the processors that share the cache line and the state of that sharing. Thus in the table of FIG. 5, the cache line shared state for a state value "1" indicates the owner is processor 1 and contains shared state flags for processors 2, 4, 6 and 8. For shared state value "30," the owner of the cache line is processor 8 and only processor 1 has a shared state with the cache line. Shared state value 31 is for the no-match condition for cache line shared state entries and flags the need for "escape" to an additional process or to a supplemental directory. The criteria for building a cache line table and another example of entries in such a cache line table will now be described. In this example the total number of nodes (or cache domains) is eight. If n=8 in the n-bit state value in the directory, and if three bits are used to identify the owner, there are five bits remaining to identify shared states. With those five bits one can encode 32 state values. Allowing for some general states there is enough state values remaining to encode all possible sharing states among nodes 0–3 and with some trade offs, possibly among nodes 0–4.

For example:

| | |
|---|---|
| broadcast | 1 |
| no sharers | 1 |
| any individual sharer | 8 |
| all pairs of sharers from nodes 0–3 C(4, 2) | 6 |
| all triples of sharers from nodes 0–3 C(4, 3) | 4 |
| | 20 |

This is sufficient to encode all the general states as well as all possible sharing states among the first 4 nodes. If there are actually more than 4 nodes some nodes have to be more privileged in the encoding than others. To implement this the following is needed: a transition function, add-sharer, which given a state and a new sharer returns the new state, a function, known-sharers, which given a state returns a bit vector of the known sharers, and a function possible-sharers, which given a state returns a bit vector of the possible sharers. The last two differ only in how they handle the broadcast state; the former gives an all zero bit vector while the latter gives all ones.

There is some redundancy here because for n nodes there can be a most n−1 sharers. To fully exploit this however requires the mapping from sharer labels encoded in the states to actual node numbers to be dynamic depending on the current owner. (E.g. if the current owner is 0, then sharer 0 is node 1, sharer 1 is node 2, etc. If the current owner is 1, then sharer 0 is node 0, sharer 1 is node 2, etc). One possible way of dealing with this is to make the current owner be a parameter to possible-sharers and known-sharers and add a function, node-to-sharer, which given the current owner and a node number given the sharer index. Given this, it is possible to encode all possible sharing states for 4 sharers:

| | |
|---|---|
| broadcast | 1 |
| no sharers | 1 |
| any individual sharer | 7 |
| all pairs from sharers 0–3 C(4, 2) | 6 |
| all triples from sharers 0–3 C(4, 3) | 4 |
| all sharers 0–3 | 1 |
| | 20 |

There is a complication with this method in that an ownership change requires a translation of the state label. The only time this happens, when there are any sharers, is on a NUMA (Non Uniform Memory Access) writeback.

Consider in addition the maintaining of previous owner state of no-sharers case for competitive algorithms, then:

| | |
|---|---|
| broadcast | 1 |
| no sharers - previous owner | 8 |
| any individual sharer | 7 |
| all pairs from sharers 0–3 C(4, 2) | 6 |
| all triples from sharers 0–3 C(4, 3) | 4 |
| all sharers D-3 | 1 |
| | 27 |

For a system with 5 or fewer nodes why not optimize for directory entry for the above case.

For example, with n=8 and a 3 bit owner field, the other 5 bits designate the sharers if set. The position of a sharing bit determines the node id of a sharer. Some sharing bits could designate 2 nodes. Then:

| Bits | Use |
|---|---|
| 7–5 | Owner |
| 4 | If 1 node #0 is a sharer |
| 3 | If 1 node #1 is a sharer |
| 2 | If 1 node #2 and node #5 may be sharers |
| 1 | If 1 node #3 and node #6 may be sharers |
| 0 | If 1 node #4 and node #7 may be sharers |

Non-existing nodes are filtered out with a mask of active nodes.

If the system has 5 or less nodes numbered in such a way that there exist no 2 nodes whose sharing status is designated with the same bit, the directory will always exactly determine all the sharers. A five node system with nodes numbered 0 1 2 3 4 is an example of such a system.

It is evident that there are multiple algorithms that can be used to set the criteria for building the cache line tables. These criteria depend on the system design and can be set during the system design development.

The above example illustrates an alternate embodiment in which a single state value encodes more that one possible cache line shared states word. The advantage of this embodiment is that, when a system has less than the maximum number of nodes, or cache domains, there would be no ambiguity in the state value encoding. In this way directory memory space may be saved by limiting the size of state value space. For maximally configured systems, the ambiguity in the state value could be resolved by broadcasting to all possible nodes allowed by the multiple encoding.

To illustrate the above, consider a system architecture with a maximum number of eight nodes. Let the state value X imply that either or both node 0 and node 4 may be sharers. In an instance of the system with only four nodes (0 . . . 3), state value X is not ambiguous—since there is no node 4. In such a situation, state value X indicates uniquely that node 0 is a sharer. In an instance of the system with five or more nodes, state value X is a situation that requires limited broadcast to node 0 and node 4 since either or both could be sharers.

In another embodiment of the invention, the processors in the multi processor system may be grouped into a domain. Referring again to FIG. 1, processors P0, P1 and P2 represent a domain 18 of three processors. This domain may be treated as a single node or a single processing system relative to the cache lines states directory system 14. Thus, the processors in domain 18 might use a Snoopy protocol to maintain track of each others cache systems. When working with cache systems outside of the domain, the domain would use the cache line states directory system 14 as described above.

In another embodiment of the invention, the cache line states directory is a fully mapped directory. In this embodiment, all cache line shared state words are encoded into a state value. When implementing a fully mapped directory, the CLSS entry table, or cache line table, need not have an "escape" or supplemental entry.

While the invention has been particularly shown and described with reference to preferred embodiments thereof, it will be understood by those skilled in the art that various other changes in the form and details may be made therein without departing from the spirit and scope of the invention.

We claim:

1. Directory system apparatus for directing cache line access requests from processors in a multi-processor system with a shared memory system, each of the processors having a cache, each of the caches storing cache lines, each cache line owned by the processor controlling the cache that the cache line resides in, each cache line available for sharing with all of the processors in the multi-processor system, said directory system apparatus comprising:

a cache line states directory storing a state value that identifies a cache line shared states word;

said cache line shared states word identifying the processor that owns the cache line and the state of access of each processor that shares access to the cache line;

a state value encoder responsive to a cache line shared state word for encoding the cache line shared state word into a state value and loading the state value into the cache line states directory; and a state value decoder responsive to a state value from said cache line states directory for decoding the state value into a cache line shared state word for use by the cache line directory system in retrieving the cache line.

2. The apparatus of claim 1 and in addition:

a plurality of cache line tables, each cache line assigned to one of the tables;

each of said cache line tables storing a plurality of cache line shared state words for the cache line assigned to the table and storing a state value for each cache line shared state word stored in the table;

said encoder performing a table look-up based on the cache line shared state word in the assigned cache line table to encode the cache line shared state word into a state value; and said decoder performing a table look-up based on the state value in the assigned cache line table to decode the state value into a cache line shared state word.

3. The apparatus of claim 2 wherein:

each cache line is a block of data stored in cache;

said state value is an n-bit word;

each of said cache line tables has an entry capacity to store $2^n$ entries of cache line shared state words with their corresponding state value.

4. The apparatus of claim 3 wherein:

each of said cache line tables stores an ordered list of $2^n-1$ cache line shared state words and their corresponding state values and one entry containing a state value to identify an escape process for cache line shared state words not included in the list.

5. The apparatus of claim 4 wherein the ordered list is a list of cache line shared state words that have the most significance to the multi-processor system.

6. A method for directing cache line access requests from processors in a multi-processor system with a shared memory system, each of the processors having a cache, each of the caches storing cache lines, each cache line owned by the processor controlling the cache that the cache line resides in, each cache line available for sharing with other processors in the multi-processor system, said method comprising the computer implemented steps of:

encoding a cache line shared states word into a state value, said cache line shared states word identifying the processor that owns the cache line and processors that share access to the cache line;

storing the state value in a cache line directory, said state value points to a cache line shared states word; and decoding the state value from the cache line directory into a cache line shared state word for use by the cache line directory system in retrieving the cache line.

7. The method of claim 6 further comprising the computer implemented steps of:

storing a plurality of cache line shared state words in a cache line table and storing an associated state value for each cache line shared state word stored in the table;

said encoding step performing a table look-up based on the cache line shared state word in the cache line table to encode the cache line shared state word into a state value; and said decoding performing a table look-up based on the state value in the cache line table to decode the state value into a cache line shared state word.

8. The method of claim 7 wherein said state value is an n-bit word and the cache line table has a entry capacity to store $2^n$ entries of cache line shared state words with their associated state value.

9. The method of claim 8 wherein the cache line tables stores an ordered list of $2^n-1$ cache line shared state words and their associated state values and one entry containing a state value to identify an escape process for cache line shared state words not included in the list.

10. The method of claim 9 wherein the ordered list is a list of cache line shared state words that have the most significance to the multi-processor system.

* * * * *